(12) United States Patent
Silva

(10) Patent No.: US 8,428,559 B2
(45) Date of Patent: Apr. 23, 2013

(54) METHOD FOR RECORDING MOBILE PHONE CALLS

(76) Inventor: Christopher Anthony Silva, Little Egg Harbor, NJ (US)

( * ) Notice: Subject to any disclaimer, the term of this patent is extended or adjusted under 35 U.S.C. 154(b) by 0 days.

(21) Appl. No.: 13/164,089

(22) Filed: Jun. 20, 2011

(65) Prior Publication Data

US 2011/0250870 A1 Oct. 13, 2011

Related U.S. Application Data

(63) Continuation-in-part of application No. 12/892,110, filed on Sep. 28, 2010.

(60) Provisional application No. 61/246,783, filed on Sep. 29, 2009.

(51) Int. Cl.
*H04M 1/725* (2006.01)

(52) U.S. Cl.
USPC ........................................ 455/412.1; 379/67.1

(58) Field of Classification Search ............... 379/67.1, 379/32.01, 201.01; 455/412.1, 412.2; 706/12, 706/46; 709/204
See application file for complete search history.

(56) References Cited

U.S. PATENT DOCUMENTS

| | | | |
|---|---|---|---|
| 5,535,261 A | 7/1996 | Brown et al. | |
| 5,875,223 A | 2/1999 | Nylund | |
| 5,983,093 A | 11/1999 | Haimi-Cohen | |
| 6,072,860 A | 6/2000 | Kek et al. | |
| 6,122,239 A | 9/2000 | Bodo et al. | |
| 6,243,594 B1 | 6/2001 | Silberfenig | |
| 6,246,489 B1 | 6/2001 | Park | |
| 6,278,772 B1 | 8/2001 | Bowater et al. | |
| 6,369,919 B1 | 4/2002 | Drinkwater et al. | |
| 6,510,220 B1 | 1/2003 | Beckett, II et al. | |
| 6,661,879 B1 | 12/2003 | Schwartz et al. | |
| 6,668,044 B1 | 12/2003 | Schwartz et al. | |
| 6,684,044 B2 | 1/2004 | Hayashi | |
| 6,690,950 B2 | 2/2004 | Takagi et al. | |

(Continued)

FOREIGN PATENT DOCUMENTS

| CN | 101370046 A | 2/2009 |
|---|---|---|
| EP | 1071266 A1 | 1/2001 |

(Continued)

OTHER PUBLICATIONS http://www.killermobile.com/manuals/TR.pdf "Total Recall Android | Call Recorder User Manual", 2011.

*Primary Examiner* — Patrick Edouard
*Assistant Examiner* — Myron K Wyche
(74) *Attorney, Agent, or Firm* — Porzio, Bromberg & Newman, P.C.

(57) ABSTRACT

The present invention generally relates to a system and method for recording mobile phone calls for record keeping. The present invention utilizes a software call-recording application installed on the mobile phone to make a direct connection to a centralized recording server utilizing a conference or three-way calling feature on the mobile phone. The centralized recording server can answer the incoming call from the mobile phone. The incoming call can be tagged with an identification. The recording server can then capture the audio and any data and store the audio and data for future use. In one embodiment, a recording can be made at the mobile phone and forwarded to the recording server. The recording can be initiated remotely.

16 Claims, 4 Drawing Sheets

U.S. PATENT DOCUMENTS

| | | |
|---|---|---|
| 6,785,515 B1 | 8/2004 | Sommer et al. |
| 6,792,093 B2 | 9/2004 | Barak et al. |
| 6,823,184 B1 | 11/2004 | Nelson |
| 6,944,287 B2 | 9/2005 | Mori |
| 6,983,057 B1 | 1/2006 | Ho et al. |
| 6,987,841 B1 | 1/2006 | Byers et al. |
| 7,042,987 B2 | 5/2006 | Schwartz et al. |
| 7,054,420 B2 | 5/2006 | Barker et al. |
| 7,079,637 B1 | 7/2006 | McNitt et al. |
| 7,233,788 B2 | 6/2007 | Kedem |
| 7,302,242 B2 | 11/2007 | Tokunaga |
| 7,336,654 B2 | 2/2008 | Barkley et al. |
| 7,336,655 B2 | 2/2008 | Murakami et al. |
| 7,389,526 B1 | 6/2008 | Chang et al. |
| 7,502,448 B1 | 3/2009 | Elman et al. |
| 7,551,732 B2 | 6/2009 | Anders |
| 2001/0041559 A1 | 11/2001 | Salabaschew |
| 2002/0067810 A1 | 6/2002 | Barak et al. |
| 2002/0101855 A1 | 8/2002 | Lai et al. |
| 2002/0118796 A1* | 8/2002 | Menard et al. ............... 379/45 |
| 2002/0118798 A1* | 8/2002 | Langhart et al. ............ 379/67.1 |
| 2003/0012346 A1 | 1/2003 | Langhart et al. |
| 2003/0223552 A1 | 12/2003 | Schoeman |
| 2004/0028193 A1 | 2/2004 | Kim |
| 2004/0047451 A1 | 3/2004 | Barker et al. |
| 2004/0106397 A1 | 6/2004 | Yamagishi et al. |
| 2004/0131161 A1 | 7/2004 | Schwartz et al. |
| 2004/0136503 A1 | 7/2004 | Kass |
| 2004/0137945 A1 | 7/2004 | Takagi et al. |
| 2004/0202291 A1 | 10/2004 | Skinner |
| 2005/0129186 A1 | 6/2005 | Dabush-Dorel et al. |
| 2005/0141674 A1* | 6/2005 | Brown et al. ............ 379/32.01 |
| 2005/0152530 A1 | 7/2005 | Pence et al. |
| 2005/0157854 A1 | 7/2005 | Lo et al. |
| 2005/0246242 A1 | 11/2005 | Proctor |
| 2005/0286708 A1 | 12/2005 | Slosberg et al. |
| 2006/0074623 A1 | 4/2006 | Tankhiwale |
| 2006/0126817 A1 | 6/2006 | Beckett, II et al. |
| 2007/0032225 A1 | 2/2007 | Konicek et al. |
| 2007/0071206 A1 | 3/2007 | Gainsboro et al. |
| 2007/0111756 A1 | 5/2007 | Reed |
| 2007/0121582 A1 | 5/2007 | Fries |
| 2007/0136432 A1 | 6/2007 | Murakami et al. |
| 2007/0189711 A1* | 8/2007 | Ash et al. ..................... 386/83 |
| 2007/0211876 A1 | 9/2007 | Othmer et al. |
| 2007/0232297 A1 | 10/2007 | Noda et al. |
| 2008/0075255 A1* | 3/2008 | Nguyen et al. ........ 379/202.01 |
| 2008/0084976 A1 | 4/2008 | Brackmann |
| 2008/0201143 A1 | 8/2008 | Olligschlaeger et al. |
| 2008/0292070 A1 | 11/2008 | Winter et al. |
| 2009/0060158 A1 | 3/2009 | Mertz et al. |
| 2009/0110161 A1 | 4/2009 | Darrow |
| 2009/0234796 A1 | 9/2009 | Cropper et al. |
| 2009/0299743 A1 | 12/2009 | Rogers |
| 2010/0034363 A1 | 2/2010 | O'Connell et al. |
| 2010/0057473 A1 | 3/2010 | Kong et al. |
| 2010/0158203 A1 | 6/2010 | Mikan et al. |
| 2011/0106736 A1* | 5/2011 | Aharonson et al. ............ 706/12 |

FOREIGN PATENT DOCUMENTS

| | | |
|---|---|---|
| EP | 1178651 A2 | 2/2002 |
| EP | 1811759 A1 | 1/2006 |
| GB | 2393080 A | 3/2004 |
| GB | 2428347 A | 1/2007 |
| JP | 2006191436 A | 7/2006 |
| JP | 200781526 A | 3/2007 |
| KR | 1020040030935 A | 4/2004 |
| KR | 20060123882 A | 12/2006 |
| WO | 02082793 A1 | 10/2002 |
| WO | 03096662 A1 | 11/2003 |
| WO | 2004006551 A1 | 1/2004 |
| WO | 2005009017 A1 | 1/2005 |
| WO | 2005053290 A1 | 6/2005 |
| WO | 2007084146 A2 | 7/2007 |
| WO | 2008102055 A1 | 8/2008 |
| WO | WO 2008/102055 * | 8/2008 |
| WO | WO2008102055 * | 8/2008 |
| WO | 2009040706 A2 | 4/2009 |
| WO | 2009080704 A1 | 7/2009 |

* cited by examiner

METHOD FOR RECORDING MOBILE PHONE CALLS

CROSS REFERENCE TO RELATED APPLICATION

This application is a continuation-in-part of U.S. patent application Ser. No. 12/892,110 filed Sep. 28, 2010, which claims the benefit of U.S. Provisional Patent Application No. 61/246,783, filed Sep. 29, 2009, the entirety of which applications are both hereby incorporated by reference into this application.

BACKGROUND OF THE INVENTION

1. Field of the Invention

The present invention generally relates to data recording a mobile phone call conversation in which an incoming or outgoing call is automatically conferenced to a centralized recording server and audio from the internal call can be captured and stored.

2. Description of Related Art

Systems which record conversations of calls are known. U.S. Pat. No. 7,502,448 directed to an apparatus and system for transmitting, receiving and recording two-way conversation data over a wireless network via a wireless communication device. A memory is coupled to the wireless communication device for storing two-way conversation data in digital form. A device interface transfers conversation information from the wireless communication device to a remote storage device. A user interface is configured to allow a user of the wireless communication device to access, by way of a wireless network, the two-way conversation data stored in the remote storage device. The user interface includes a plurality of data management functions that allows the user of the wireless communication device to manage, by way of the wireless network, the two-way conversation data stored in the remote storage device. The data management function includes functions for editing and translating the two-way conversation data stored in the remote storage device, such as searching, linking, downloading, editing, playing back, converting, sending, archiving, and deleting the two-way conversation data stored in the storage location.

WO 2009/040706 is related to conversation recording on mobile telephones with subsequent transfer to a central database. A telecommunication system for managing telecommunication data includes a mobile telephone communication device that is able to make and receive telephone calls via a public telephone network and which has a storage arrangement for storing a telephone communication during a telephone session. A processing facility processes the telephone communication. A transferring means transfers the stored telephone communication from the mobile telephone communication device to the processing facility. The transfer can take place automatically, immediately after the telephone session ends or at a later time, as determined by a user of the telephone. Also, the user can decide whether or not to delete the stored telephone communication. If the user decides to transfer the telephone communication immediately after the telephone session ends, this will be effected via a communication channel using the cellular public telephone network and gateway, and a data transmission.

It is desirable to provide a method a system for mobile phone recording in which audio can be automatically forwarded or delivered when desired to a central server for audio recording.

SUMMARY OF THE INVENTION

The present invention generally relates to a system and method for recording mobile phone calls for record keeping. Embodiments of the present invention can include a central server for audio recording of mobile phone conference calls.

Mobile phones are becoming more and more prevalent for organizations of all types. It is desirable for organizations to record the audio conversations occurring on mobile phones. The present invention utilizes a software call-recording application installed on the mobile phone to make a direct connection to a centralized recording server utilizing a conference or three-way calling feature on the mobile phone. The centralized recording server can answer the incoming call from the mobile phone on any type of equipment used to provide voice communication over distances, such as traditional time-division multiplexing (TDM) and voice over internet (VOIP).

When an audio call is initiated, incoming or outgoing, on the mobile phone, the mobile phone connects to a centralized recording server via TDM, VOIP, or other telephony, by utilizing a conference or three-way calling capability of the mobile phone to deliver the audio to the centralized recording server where it will be recorded. The conference and connection to the recording server can be set to be automatic, requiring no intervention by the mobile phone user. Alternatively, the user can set a call recording application on the mobile phone to deliver the audio only when desired. In one embodiment, a user interface allows a user to enter a predetermined identification which can be tagged to the audio call prior to transfer to the centralized recording server for subsequent expeditious identification of the call.

In one embodiment, the user interface allows the mobile phone to be used as a recorder by recording a conversation with a speaker phone microphone. The user can enter a predetermined or user entered identification which can be tagged to the recorded conversation prior to transfer to the centralized recording server for subsequent expeditious identification of the recorded call. This information can be optionally selected prior to any recording, chosen at the end of the recording, or entered at the beginning or end of the recording if the desired data element is not present in the predetermined list. The user can select calls to be recorded based on one or more conditions, such as, for example, dialed number information, caller ID information, calls within a certain radius of a GPS location, incoming status and outgoing status.

In one embodiment, a remote administrator can initiate recording at the mobile phone. A device of the mobile phone, such as, for example, a microphone, camera or alternate device connected with a wired or wireless connection can be activated to initiate recording. The remote administrator can initiate the recording, for example, by using a short message service (SMS) message, establishing a call with the mobile phone and supplying a code, establishing an Internet connection, sensing a Global Positioning Service (GPS) location, or sensing an environment of the user. For example, the environment of the user can be related to sensing the speed of movement of the mobile phone, sensing a shock to the mobile phone, sensing a temperature of the mobile phone, sensing a heart rate of a user of the mobile phone and sensing availability of a network of the mobile phone.

Mobile phones have an inherent capability to conference or have three or more parties involved on a call. The call recording application utilizes the conference capability and automatically or on demand, connects the mobile phone call to a recording server via conventional telephony means (wireless or TDM), via VOIP, or other telephony means to include the recording server as a third party to the mobile phone call. The recording server can also capture short message service (SMS) messages and multimedia messaging (MMS) messages. The recording server can then capture the audio, any recorded audio, and any data or messages presented independently of the audio and store the data for future use. Individuals or organizations can install the call recording application on the mobile phone and program it with the telephone number to dial to make the third party connection to a recording server.

The invention will be more fully described by reference to the following drawings.

DETAILED DESCRIPTION OF THE INVENTION

Figure 1:
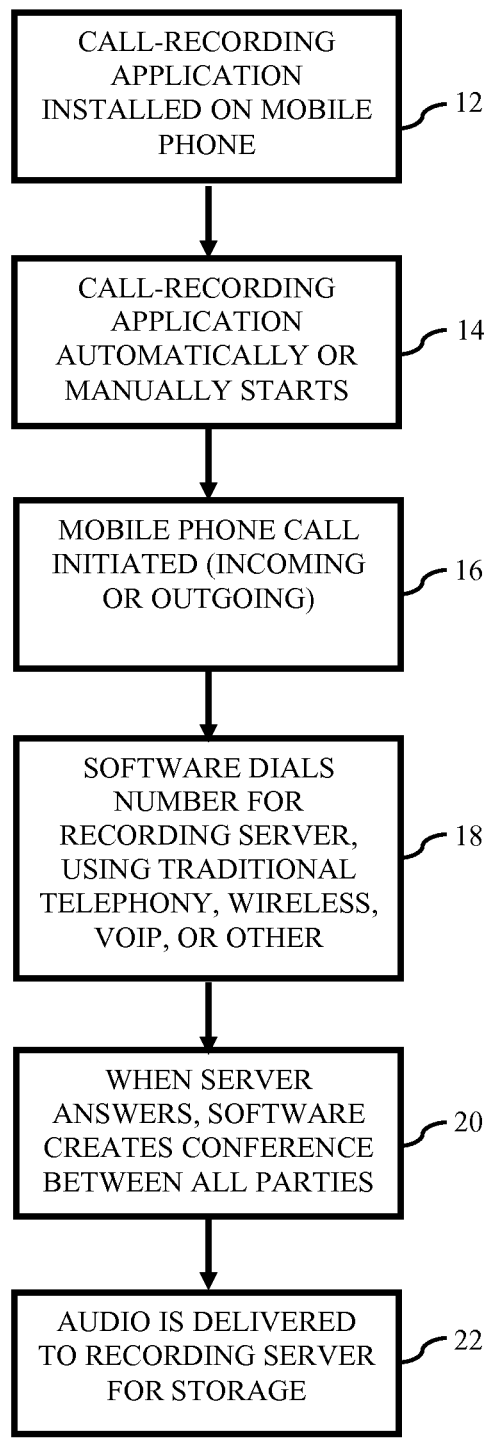
FIG. 1 is a flowchart of a method for recording cell phone conference calls in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flowchart 10 that shows the process of recording audio and data from a mobile phone call, for example, during a conversation, in accordance with the teachings of the present invention. In block 12, a call-recording application can be installed on a wireless phone, such as a mobile phone. In block 14, the call-recording application can start either automatically or manually. The call-recording application can include an interface for the user or can be undetectable to the user. In one embodiment, the user can select calls to be recorded based on one or more of the following: dialed number information; caller ID information; calls within a certain radius of a GPS location; incoming status; and outgoing status. In one embodiment, the mobile phone can be used as a recorder by recording a conversation at the mobile phone with a speaker phone microphone.

In block 16, an external call to another phone can be initiated or received by the wireless phone including the call-recording application. In block 16, an external call to another phone can be initiated or received by the wireless phone including the call-recording application. In block 18, the call-recording application can establish a conference call to a recording server. The call recording application utilizes the conference capability of the mobile phone to call a number of a recording server via conventional telephony means (wireless or TDM), via VOIP, or other telephony means. The call-recording application can be programmed with a telephone number of the recording server. In block 20, after the server answers, the call recording application includes the recording server as a third party to the mobile phone call between the parties. In block 22, audio from the call is delivered to the recording server. The recording server can write the audio to storage at the recording server.

Figure 2:
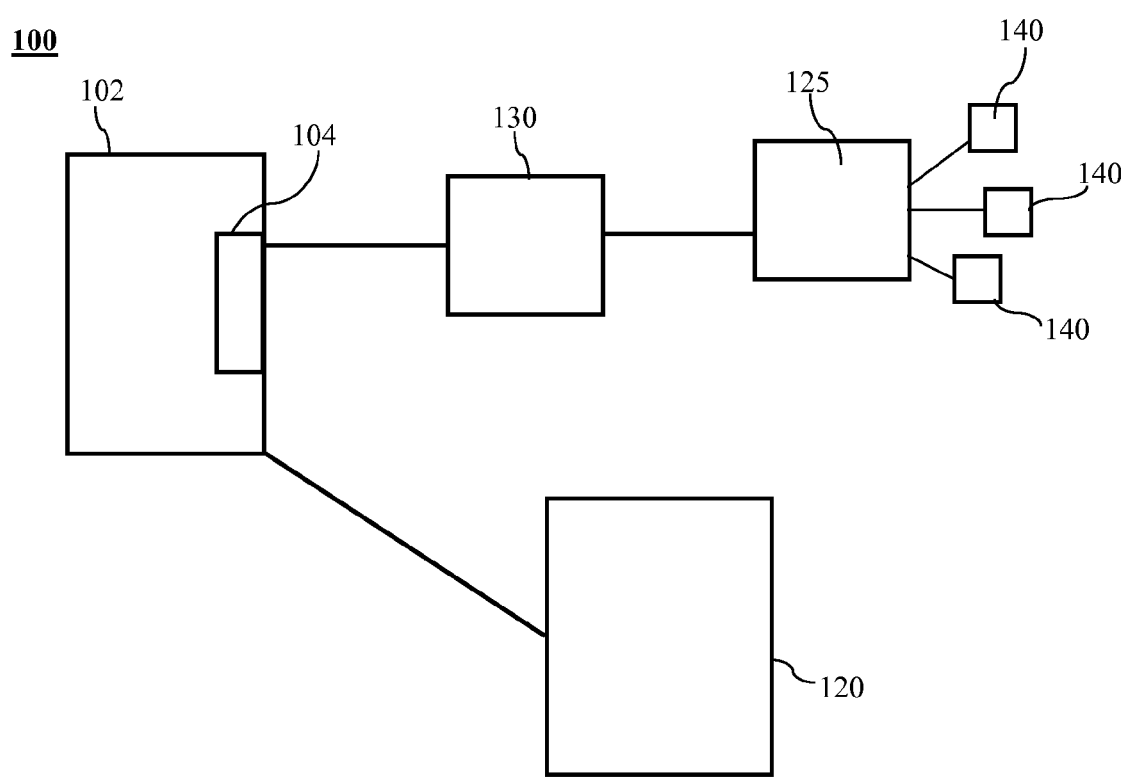
FIG. 2 is a schematic diagram of system for recording a mobile phone call conversation.

FIG. 2 is a schematic diagram of system for recording a phone call 100. Wireless phone 102 includes call-recording application 104. Preferably, wireless phone 102 is a mobile phone. Phone 120 can establish a call to wireless phone 102 or wireless phone 102 can receive a call from phone 120. Phone 120 can be either a landline connected telephone or a mobile phone. Call-recording application 104 establishes a conference with recording server 130. Recording server 120 includes storage 125 for storing audio of the established conference call. For example, storage 125 can include one or more third-party recorder databases 140.

Figure 3:
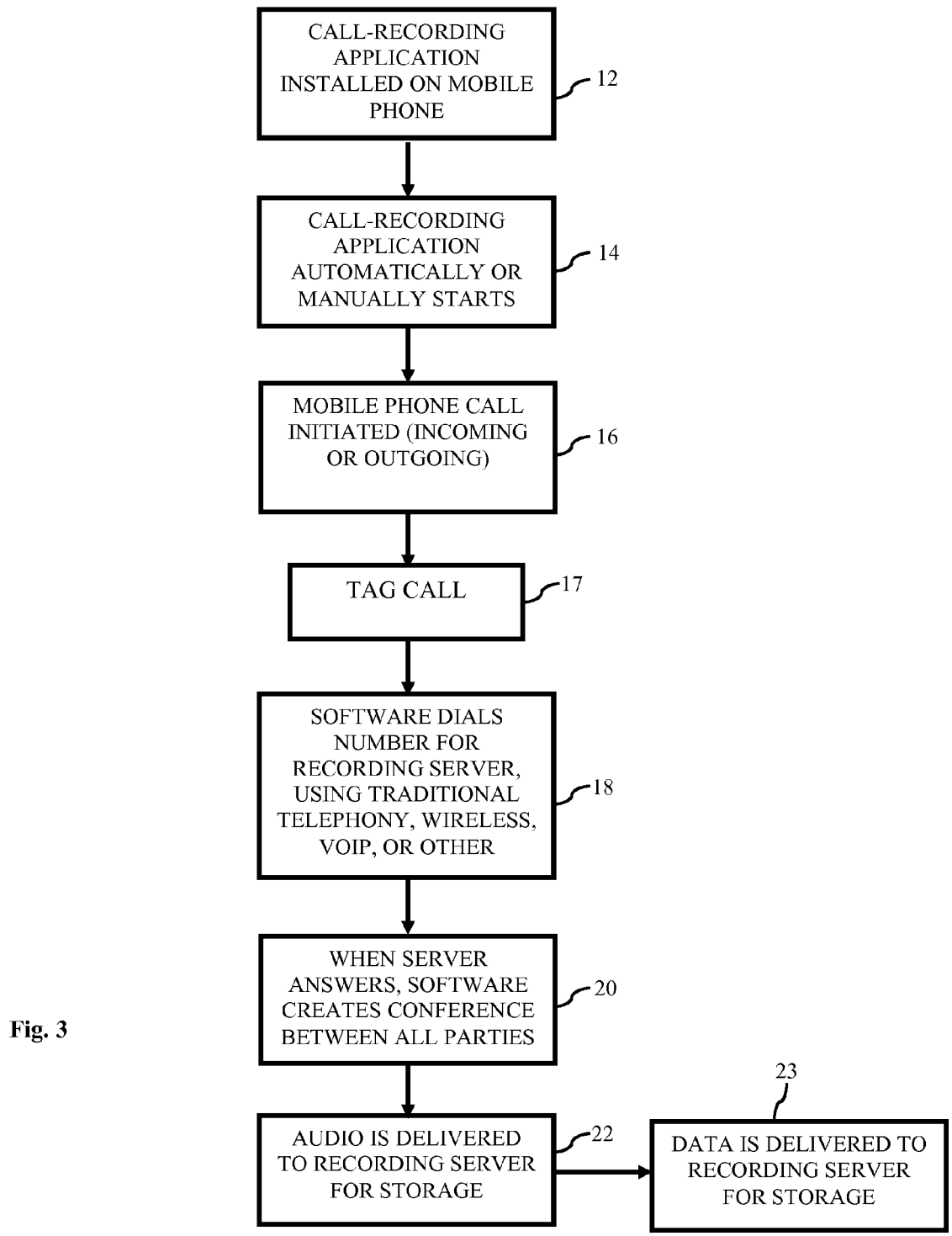
FIG. 3 is a flowchart of an alternative method for recording cell phone conference calls in accordance with an embodiment of the present invention.

FIG. 3 is a flow chart of an alternate embodiment of the process for recording at the mobile phone. In block 17, the user can enter a predetermined identification or identification entered manually prior or subsequent to the recording which can be tagged to the recorded conversation prior to transfer to the centralized recording server for subsequent expeditious identification. In block 23, any data or messages presented independently of the audio is delivered to the recording server. For example, the messages can include short message service (SMS) messages and multimedia messaging (MMS) messages. It will be appreciated that other message types using for example text, pictures or video utilized by the mobile phone can be delivered to the recording server in accordance with the teachings of the present invention.

Figure 4:
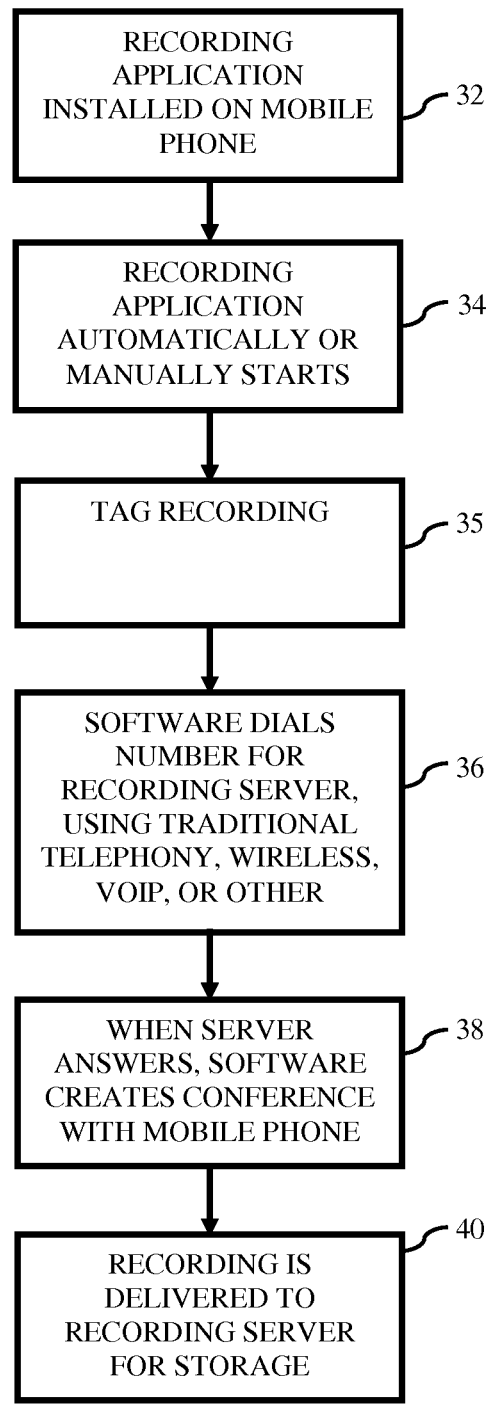
FIG. 4 is a flowchart of an alternative method for recording cell phone conference calls in accordance with an embodiment of the present invention.

FIG. 4 is a flow chart of an alternate embodiment of a the process for recording at the mobile phone. In block 32, a recording application can be installed on a wireless phone, such as a mobile phone. In block 34, the recording application can start either automatically or manually. The recording application can include an interface for the user or can be undetectable to the user. In one embodiment, a remote administrator can initiate recording at the mobile phone. A device of the mobile phone, such as, for example, a microphone, camera or alternate device connected with a wired or wireless connection can be activated to initiate recording. The remote administrator can initiate the recording, for example, by using a short message service (SMS) message, establishing a call with the mobile phone and supplying a code, establishing an Internet connection, sensing a Global Positioning Service (GPS) location, or sensing an environment of the user. For example, the environment of the user can be related to sensing the speed of movement of the mobile phone, sensing a shock to the mobile phone, sensing a temperature of the mobile phone, sensing a heart rate of a user of the mobile phone and sensing availability of a network of the mobile phone.

In block 35, the user can enter a predetermined identification which can be tagged to the recording prior to transfer to the centralized recording server for subsequent expeditious identification. In block 36, the call-recording application can establish a conference call or a call to a recording server. The call-recording application can be programmed with a telephone number of the recording server. In block 38, after the server answers, the call recording application establishes a call with the recording server. In block 40, recorded audio is delivered to the recording server. Any data or messages presented independently of the audio is also delivered to the recording server. For example, the messages can include short message service (SMS) messages and multimedia messaging (MMS) messages. It will be appreciated that other message types using for example text, pictures or video utilized by the mobile phone can be delivered to the recording server in accordance with the teachings of the present invention. The recording server can write the audio, data and messages to storage at the recording server.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for recording a mobile phone conference call between two or more parties comprising the steps of:
   establishing an external call between a first call number of a first mobile phone and a second phone;
   conferencing a recording server to the external call as a three way call between the first mobile phone, the second phone and the recording server using a call recording application on the first mobile phone to utilize a conference capability of the first mobile phone for initiating a call with a second call number of the recording server and establishing a conference call between the first mobile phone, the second phone, and the recording server, the conference capability utilizing voiceover internet (VOIP);
   capturing an audio signal from the external call at said recording server; and
   recording the captured audio signal at the recording server; wherein the recording server is an application resident to the first mobile phone and allows the first mobile phone to act as a third leg of the conference call via the voiceover internet (VOIP); wherein the recorder server application allows the first mobile phone to be two parties on the three way call by establishing the call to the recording server, where one party is an external call interface of the external call and a second party is a voiceover internet (VOIP) interface via the voiceover internet (VOIP) conference capability in which the first call number and the second call number provide the first mobile phone with two unique telephone identities.

2. The method of claim 1 wherein said step of conferencing a recording server is performed automatically.

3. The method of claim 1 wherein said step of conferencing a recording sever is performed on demand.

4. The method of claim 1 wherein before the step of conferencing further comprising the step of:
   tagging the external call with an identification.

5. The method of claim 1 wherein after the step of conferencing further comprising the step of:
   capturing short message service (SMS) messages and/or multimedia messaging (MMS) messages sent to the first mobile phone, and forwarding the captured messages independent of the audio signal to the recording server.

6. A method for recording at a mobile phone comprising the steps of:
   recording using the mobile phone having a first call number;
   conferencing a recording server to the mobile phone using a call recording application on the mobile phone to utilize a conference capability of the mobile phone for initiating a call with a second call number of the recording server and establishing a conference call between the mobile phone and the recording server, the conference capability utilizing voiceover internet (VOIP);
   capturing the recording at said recording server; and
   storing the captured recording at the recording server; wherein the recording server is an application resident to the mobile phone and allows the mobile phone to act as a third leg of the conference call via the voiceover internet (VOIP); wherein the recorder server application allows the mobile phone to be two parties on the three way call by establishing the call to the recording server, where one party is an external call interface of the external call and a second party is a voiceover internet (VOIP) interface via the voiceover internet (VOIP) conference capability in which the first call number and the second call number provide the mobile phone with two unique telephone identities.

7. The method of claim 6 wherein before the step of conferencing further comprising the step of:
   tagging the recording with an identification.

8. The method of claim 6 wherein the step of conferencing is performed automatically based on one or more of: dialed number information, caller ID information, calls within a certain radius of a GPS location, incoming status and outgoing status.

9. The method of claim 6 wherein the recording is initiated by a short message service (SMS) message, establishing a call with the mobile phone and supplying a code, establishing an Internet connection, sensing a Global Positioning Service (GPS) location, or sensing an environment of the user.

10. The method of claim 9 wherein the sensing an environment of a user comprises one or more of:
    sensing the speed of movement of the mobile phone;
    sensing a shock to the mobile phone;
    sensing a temperature of the mobile phone;
    sensing a heart rate of a user of the mobile phone; and
    sensing availability of a network of the mobile phone.

11. A system for recording a mobile phone conference call between two or more parties comprising:
    means for establishing an external call between a first call number of a first mobile phone and a second phone;
    means for tagging said external call with an identification;
    means for conferencing a recording server to the external call as a three way call between the first mobile phone, the second phone and the recording server using a call recording application of the first mobile phone to utilize a conference capability of the first mobile phone for initiating a call with a second call number, the recording server and establishing a conference call between the first mobile phone, the second phone and the recording server, the conference capability utilizing voiceover internet (VOIP);
    means for capturing an audio signal from the external call at said recording server; and
    means for recording the captured audio signal at the recording server; wherein the recording server is an application resident to the first mobile phone and allows the first mobile phone to act as a third leg of the conference call via the voiceover internet (VOIP); wherein the recorder server application allows the first mobile phone to be two parties on the three way call by establishing the call to the recording server, where one party is an external call interface of the external call and a second party is a voiceover internet (VOIP) interface via the voiceover internet (VOIP) conference capability in which the first call number and the second call number provide the first mobile phone with two unique telephone identities.

12. The system of claim 11 further comprising:
    means for capturing short message service (SMS) messages and/or multimedia messaging (MMS) messages of the first mobile phone and the second phone, and
    means for forwarding the captured messages independent of the audio signal to the recording server.

13. A system for recording at a mobile phone comprising:
    a mobile phone capable of recording, said mobile phone having a first call number;
    a recording server for receiving the recording from the mobile phone;

conferencing the recording server to the mobile phone using a call recording application of the mobile phone to utilize a conference capability of the mobile phone for initiating a call with a second call number of the recording server and establishing a conference call between the mobile phone and the recording server, the conference capability utilizing voiceover internet (VOIP); and storing the recording; wherein the recording server is an application resident to the mobile phone and allows the mobile phone to act as a third leg of the conference call via the voiceover internet (VOIP); wherein the recorder server application allows the mobile phone to be two parties on the three way call by establishing the call to the recording server, where one party is an external call interface of the external call and a second party is a voiceover internet (VOIP) interface via the voiceover internet (VOIP) conference capability in which the first call number and the second call number provide the mobile phone with two unique telephone identities.

14. The system of claim 13 wherein the recording is performed automatically based on one or more of:

dialed number information;
caller ID information;
calls within a certain radius of a GPS location;
incoming status; and
outgoing status.

15. The system of claim 13 wherein the recording is initiated by one or more of a short message service (SMS) message;
establishing a call with the mobile phone;
supplying a code,
establishing an Internet connection;
sensing a Global Positioning Service (GPS) location; or
sensing an environment of the user.

16. The system of claim 15 wherein the sensing of an environment of a user comprises one or more of:
sensing the speed of movement of the mobile phone;
sensing a shock to the mobile phone;
sensing a temperature of the mobile phone;
sensing a heart rate of a user of the mobile phone; and
sensing availability of a network of the mobile phone.

* * * * *